US009618023B2

United States Patent
Choi et al.

(10) Patent No.: US 9,618,023 B2
(45) Date of Patent: Apr. 11, 2017

(54) DISPLAY DEVICE AND FIXING ELEMENT FOR USE IN THE DISPLAY DEVICE

(71) Applicant: Samsung Display Co., Ltd., Yongin, Gyeonggi-Do (KR)

(72) Inventors: Kwang Wook Choi, Osan-si (KR); Cheol Yong Noh, Asan-si (KR); Sang Heon Ye, Cheonan-si (KR); Jae Sang Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 295 days.

(21) Appl. No.: 14/332,303

(22) Filed: Jul. 15, 2014

(65) Prior Publication Data

US 2015/0070853 A1     Mar. 12, 2015

(30) Foreign Application Priority Data

Sep. 12, 2013  (KR) .................. 10-2013-0109855

(51) Int. Cl.
*F16B 2/20* (2006.01)
*G02F 1/1333* (2006.01)
*F16B 5/06* (2006.01)

(52) U.S. Cl.
CPC .............. *F16B 2/20* (2013.01); *F16B 5/0635* (2013.01); *G02F 1/133308* (2013.01);
(Continued)

(58) Field of Classification Search
CPC .............. G09G 3/3688; G09G 3/3648; G09G 2300/842; G09G 3/3233; G09G 2300/0408; G09G 2300/026; G02F 1/1345; G02F 1/133308; G06F 3/1431; G06F 3/1423; G06F 3/1446; F16B 2/20; F16B 5/0635; A47B 81/06–81/068
See application file for complete search history.

(56) References Cited

U.S. PATENT DOCUMENTS 6,424,391 B1 * 7/2002 Tsukamoto ....... G02F 1/133308
                                                  349/58
6,580,476 B2    6/2003 Hasegawa
(Continued)

FOREIGN PATENT DOCUMENTS

KR     10-2005-0068606 A     7/2005
KR     10-2006-0017232 A     2/2006
(Continued)

*Primary Examiner* — Timothy Thompson
*Assistant Examiner* — Ahmad D Barnes
(74) *Attorney, Agent, or Firm* — Innovation Counsel LLP

(57) ABSTRACT

A display device, comprising a base cover with a base plate, a sidewall portion extended from the base plate and a first coupling hole; a display panel with a first display portion configured to display an image and a second display portion outside and along the first display portion, a top cover with a bezel portion sized to be laid over the second display portion, and a sidewall portion extended from the bezel portion, the top cover including a second coupling hole; and a fixing element with a first coupling portion having a third coupling hole, a contact portion extended from the first coupling portion and configured to maintain contact with a portion of the top cover. A coupling element can be inserted through the first through third coupling holes so as to press the contact portion against a portion of the top cover.

18 Claims, 13 Drawing Sheets

(52) U.S. Cl.
CPC .. *F16B 5/0642* (2013.01); *G02F 2001/13332* (2013.01); *G02F 2001/133314* (2013.01); *G02F 2201/46* (2013.01); *Y10T 403/606* (2015.01)

(56) References Cited

U.S. PATENT DOCUMENTS

| | | | |
|---|---|---|---|
| 7,095,462 B2 | 8/2006 | Ahn | |
| 7,623,196 B2 * | 11/2009 | Lee | G02F 1/133308 349/58 |
| 7,675,584 B2 | 3/2010 | Hsu et al. | |
| 2004/0189889 A1 * | 9/2004 | Nitto | G02F 1/133308 349/58 |

FOREIGN PATENT DOCUMENTS

| | | |
|---|---|---|
| KR | 10-2006-0135361 A | 12/2006 |
| KR | 10-2007-0076169 A | 7/2007 |
| KR | 10-2008-0026911 A | 3/2008 |
| KR | 10-2008-0036437 A | 4/2008 |
| KR | 10-2008-0109518 A | 12/2008 |
| KR | 10-2010-0093743 A | 8/2010 |
| KR | 10-2011-0075276 A | 7/2011 |
| KR | 10-2011-0131546 A | 12/2011 |
| KR | 10-2013-0045569 A | 5/2013 |

* cited by examiner

DISPLAY DEVICE AND FIXING ELEMENT FOR USE IN THE DISPLAY DEVICE

This application claims priority to Korean Patent Application No. 10-2013-0109855 filed on Sep. 12, 2013 in the Korean Intellectual Property Office, the disclosure of which is incorporated herein by reference in its entirety.

BACKGROUND

1. Field of the Invention

Embodiments of the present invention relate generally to flat panel displays. More specifically, embodiments of the present invention relate to a display device and a fixing element for use in the display device.

2. Description of the Related Art

The development of technologies not only for data processors capable of processing a considerable amount of data within a short time, but also for display devices capable of displaying the data processed by such data processors as images, has seen considerable recent progress.

Display devices convert image signals in the form of electrical signals obtained by data processors into images.

Display devices may be classified according to the types of display panels used therein. Examples of display devices include a liquid crystal display (LCD) device displaying an image by using liquid crystal molecules, an organic light-emitting diode (OLED) device displaying an image by using an organic light-emitting material, and a plasma display panel displaying an image by using plasma.

The implementation of a narrow-bezel design, i.e., a design in which a narrow bezel is provided in a non-display area along the edges of a display area, is under way to keep up with ever-increasing demand for larger display areas.

A display device typically includes a base cover to accommodate a display panel, and a top cover which is coupled to the base cover so as to fix the display panel. That is, the display panel is fixed between the base cover and the top cover.

The sidewalls of the base cover and the sidewalls of the top cover are often assembled together by side mounting.

However, in a case in which coupling elements are inserted into coupling holes formed on the base cover and the top cover, the top cover may be detached from the top surface of the display panel (especially in areas near the coupling holes), thereby causing various problems such as light leakage and contamination of components contained within.

SUMMARY

Aspects of the present invention provide a display device in which a top cover can be prevented from being detached from a display panel so as to prevent light leakage, and a fixing element for use in the display device.

However, aspects of the present invention are not restricted to the one set forth herein. The above and other aspects of the present invention will become more apparent to one of ordinary skill in the art to which the present invention pertains, by referencing the detailed description of embodiments of the present invention that is given below.

According to an aspect of the present invention, there is provided a display device, comprising a base cover having a base plate, a sidewall portion extended from edges of the base plate, and a first coupling hole. Also included is a display panel configured to be accommodated within the base cover and having a first display portion configured to display an image and a second display portion provided outside and along the first display portion. Further included is a top cover having a bezel portion sized to be laid over the second display portion, and a sidewall portion extended from the bezel portion to cover sides of the display panel, the top cover including a second coupling hole corresponding to the first coupling hole. Further included is a fixing element configured to include a first coupling portion having a third coupling hole corresponding to the first coupling hole and the second coupling hole, the fixing element further having a contact portion extended from the first coupling portion and configured and shaped to maintain contact with the sidewall portion of the top cover. The base cover, the top cover, and the fixing element are sized and shaped so as to be coupled together with the display panel contained within the base cover and with each of the first, second, and third coupling holes aligned so that a coupling element can be inserted through the first coupling hole, the second coupling hole, and the third coupling hole so as to press the contact portion against at least the sidewall portion of the top cover.

The fixing element may be further configured to include a bent portion bent more than once between the first coupling portion and the contact portion.

The first coupling portion and the contact portion may be formed to be substantially flat and oriented substantially parallel to each other, and may not be coplanar.

The fixing element may be further configured to include a plurality of contact portions extended from the first coupling portion.

The contact portions may extend substantially parallel to each other.

Two of the contact portions may have an included angle of about 10 to about 150 degrees.

The contact portion may be oriented along a first direction, the fixing element is further configured to include a fixing portion oriented along a second direction different from the first direction, and the fixing portion may cover a lower part of the sidewall portion of the top cover when the base cover, the top cover, and the fixing element are coupled together.

The top cover may have two or more discrete segments.

The second coupling hole may be positioned within a recess formed in the sidewall portion of the top cover, the recess being sized to accept the first coupling portion of the fixing element.

The recess may conform to the shape of at least the first coupling portion of the fixing element.

According to another aspect of the present invention, there is provided a display device, comprising a base cover having a base plate, a sidewall portion extended from edges of the base plate, and a first coupling hole; and a display panel configured to be accommodated within the base cover and having a first display portion configured to display an image and a second display portion provided outside and along the first display portion. Further included is a top cover having a bezel portion sized to be laid over the second display portion, a sidewall portion extended from the bezel portion to cover sides of the display panel, a second coupling hole corresponding to the first coupling hole, a second coupling portion bent more than once and extended from the sidewall portion of the top cover at a location corresponding to the second coupling hole and including a third coupling hole corresponding to the first coupling hole and the second coupling hole, an elastic connection portion extended from the second coupling portion, and a contact portion extended from the elastic connection portion. The base cover and the top cover are sized and shaped so as to be coupled together with the display panel contained within the base cover and with each of the first, second, and third coupling holes aligned so that a coupling element can be inserted through the first coupling hole, the second coupling hole, and the third coupling hole so as to press the contact portion against at least the sidewall portion of the top cover.

According to an aspect of the present invention, there is provided a fixing element, comprising a fixing element sized and configured for attachment to, and the application of pressure to, a cover of a flat panel display, the fixing element comprising a coupling portion including a coupling hole into which a coupling element is to be inserted so as to affix the coupling portion to the cover of the flat panel display, a bent portion bent more than once and extended from the coupling portion, and a contact portion extended from the bent portion and shaped so as to apply pressure to the cover of the flat panel display when the coupling portion is affixed to the cover of the flat panel display by the coupling element.

The fixing element may further include a fixing portion bent and extended from the coupling portion in a direction different than a direction along which the bent portion extends.

According to embodiments, it is possible to provide a display device capable of reducing the width of a bezel thereof.

In addition, it is possible to provide a display device capable of not only reducing the width of a bezel thereof, but also preventing the occurrence of light leakage and dislocation of the display panel so as to prevent defects and improve reliability.

Other features and aspects may be apparent from the following detailed description, the drawings, and the claims.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
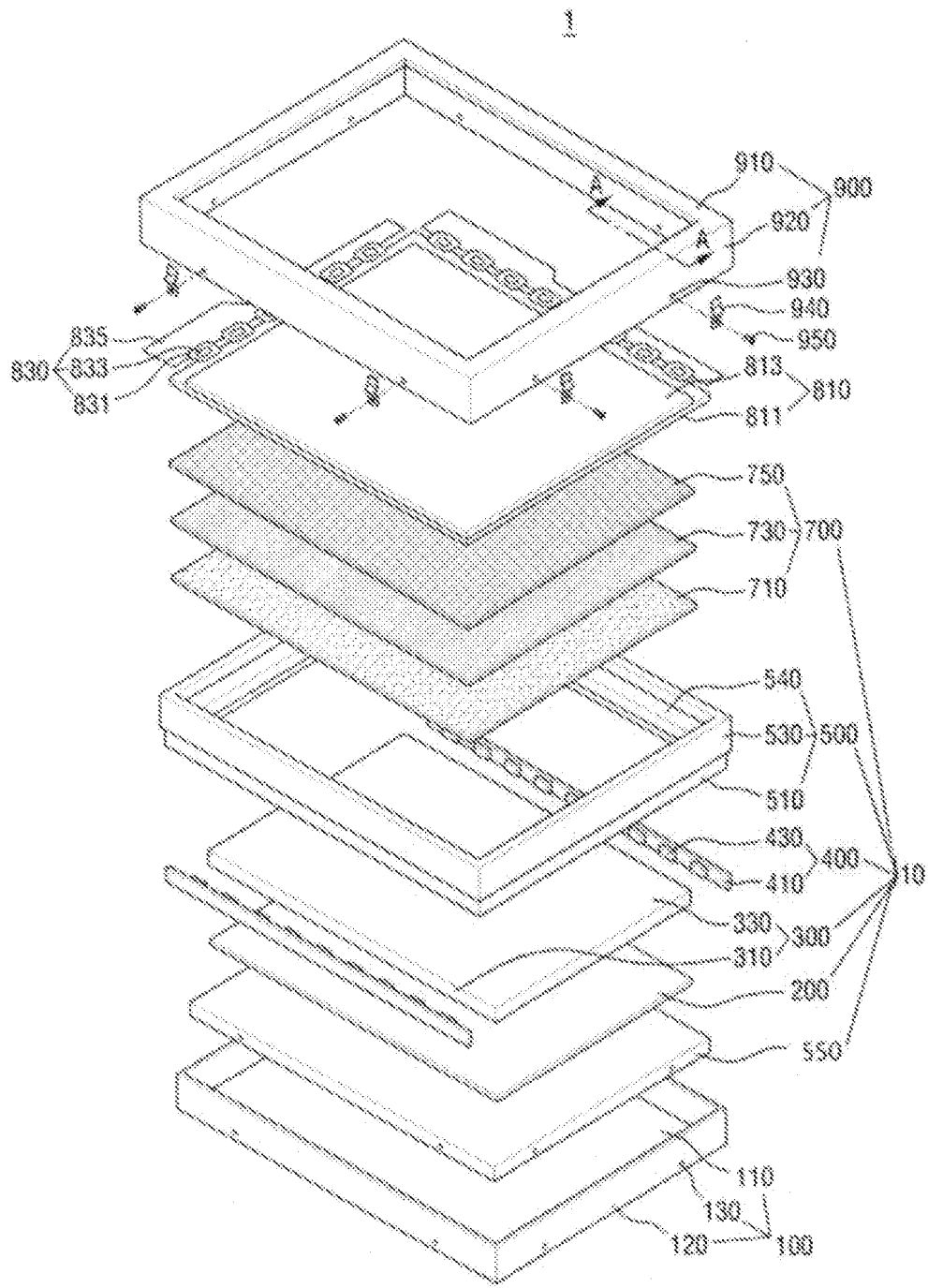
FIG. 1 is an exploded perspective view illustrating a display device according to an embodiment.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention. Also, the drawings are not necessarily to scale.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments of the present invention will be described with reference to the attached drawings.

FIG. 1 is an exploded perspective view illustrating a display device according to an embodiment.

Referring to FIG. 1, a display device 1 includes a display panel 810, a top cover 900 disposed over the display panel 810, a backlight unit 10 disposed below the display panel 810, a base cover 100 accommodating the backlight unit 10 therein and being coupled to the top cover 900, a plurality of fixing elements 940 fixing the top cover 900 from outside the top cover 900, and a coupling element 950 coupling the top cover 900, the base cover 100, and the backlight unit 10 together. The coupling element 950 can be, for example, a screw or other fastener.

The display panel 810 serves an important role for the display device 1 in displaying an image. The display panel 810 may include a first substrate 811, a second substrate 813 and a liquid crystal layer (not illustrated) interposed between the first substrate 811 and the second substrate 813.

A plurality of pixels (not illustrated) may be defined in the first substrate 811, which may also be referred to as a lower substrate, a thin-film transistor (TFT) substrate, or an array substrate, by a plurality of gate lines (not illustrated) and a plurality of data lines (not illustrated) intersecting the gate lines. A plurality of TFTs (not illustrated) may be provided at the intersections, respectively, between the gate lines and the data lines, and may be connected one-to-one to a plurality of transparent pixel electrodes at the pixels. A plurality of red (R), green (G) and blue (B) color filters corresponding to the pixels, as well as a black matrix, may be provided in the second substrate 813, which may also be referred to as an upper substrate or a color filter substrate. The black matrix is disposed between the color filters and covers the gate lines, the data lines and the TFTs. A transparent common electrode may also be provided in the second substrate 813. The transparent common electrode covers the color filters and the black matrix.

A polarizing film (not illustrated) that selectively transmits predetermined light therethrough may be attached to the exterior of the first substrate 811 and the exterior of the second substrate 813, respectively. In response to light being provided from the backlight unit 10, the polarizing film may transmit therethrough light that vibrates in the same direction as that of its polarizing axis, and may absorb or reflect the rest of the light, thereby generating light vibrating in a predetermined direction.

The polarizing film may be formed of polyvinyl alcohol, polycarbonate (PC), polystyrene, or polymethacrylate. For example, the polarizing film may be obtained by elongating a polyvinyl alcohol film and immersing the elongated film in a solution of iodine and a dichroic dye so as to align the iodine molecules and the dye molecules in the direction of elongation. In this example, since the iodine molecules and the dye molecules have dichroic properties, the polarizing film absorbs light vibrating in the elongated direction thereof, and transmits therethrough light vibrating in a direction perpendicular to the elongated direction thereof.

A driving unit 830 for applying driving signals may be provided on one side of the first substrate 811. The driving unit 830 may include a flexible printed circuit board (FPCB) 831, a driving chip 833 mounted on the FPCB 831, and a circuit board 835 connected to the FPCB 831.

The driving chip 833 may include a data driving circuit and a gate driving circuit. In response to one or more TFTs being selected from the gate lines and being turned on by an on/off signal applied by the gate driving circuit, a signal voltage is transmitted from the data driving circuit to the pixel electrodes corresponding to the selected TFTs. As a result, an electric field may be generated between the corresponding pixel electrodes and the common electrode. Accordingly, the orientation of liquid crystal molecules in the liquid crystal layer may change, thereby resulting in a variation in transmittance which produces an image.

The top cover 900 may be disposed over the display panel 810. The top cover 900 may include a bezel portion 910 covering the edges of the display panel 810, a sidewall portion 920 covering part of a sidewall portion 510 of a mold frame 500, and a plurality of second coupling holes 930 formed through the sidewall portion 920.

The backlight unit 10, which supplies light to the bottom of the display panel 810, may be provided below the display panel 810.

The backlight unit 10 may include a light guide plate 300, one or more light source units 400, and the mold frame 500. The backlight unit 10 may also include a reflective element 200, one or more optical sheets 700, and a bracket 550.

The light guide plate 300 changes the path of light generated by the light source units 400 and thus guides the light toward the display panel 810. The light guide plate 300 may include a light incidence surface 310 which is provided on one side of the light guide plate 300 and receives light generated by the light source units 400, and a light exit surface 330 which faces the display panel 810. The light guide plate 300 may be formed of, but is not limited to, a material with a uniform refractive index, such as polymethylmethacrylate (PMMA) or PC.

Light incident upon one or both sides of the light guide plate 300 falls within a critical angle range of the light guide plate 300, and thus enters the light guide panel 300. Light incident upon the top surface or the bottom surface of the light guide plate 300 falls outside the critical angle range of the light guide plate 300, and is thus uniformly distributed throughout the light guide plate 300 without being emitted from the light guide plate 300.

A diffusion pattern (not illustrated) may be formed on one of the top surface and the bottom surface of the light guide plate 300. For example, the diffusion pattern may be formed on the bottom surface of the light guide plate 300, which is opposite to the light exit surface 330, so that light guided by the light guide plate 300 can be emitted upward from the light guide plate 300. In a non-limiting example, the diffusion pattern may be printed with ink on one surface of the light guide plate 300 so that light transmitted into the light guide plate 300 can be more uniformly emitted upward from the light guide plate 300. In another non-limiting example, the diffusion pattern may be created by forming fine grooves or protrusions on the light guide plate 300.

The display device 1 may also include the reflective element 200 between the light guide plate 300 and a bottom portion 110 of a lower storage element 100. The reflective element 200 reflects light emitted from the bottom surface of the light guide plate 300 (which is opposite to the light exit surface 330), and thus directs the light back into the light guide plate 300. The reflective element 200 may be formed as, but is not limited to, a film.

The light source units 400 may be disposed to face the light incidence surface 310 of the light guide plate 300. Two light source units 400 may be provided on two opposing sides of the light guide plate 300, as illustrated in FIG. 1, but the present inventive concept is not restricted to the example illustrated in FIG. 1. That is, the number of light source units 400 may be appropriately adjusted according to the need, and may be distributed along any portion of the light guide plate 300. In a non-limiting example, only one light source unit 400 may be provided along one side of the light guide plate 300, or three or more light source units 400 may be provided along three or more sides, respectively, of the light guide plate 300. In another non-limiting example, a plurality of light source units 400 may all be provided along one side of the light guide plate 300.

Each of the light source units 400 may include a plurality of light sources 430 and a printed circuit board (PCB) 410 on which the light sources 430 are mounted at a distance from one another.

The light sources 430 may include white light-emitting diodes (LEDs) emitting white light, or may include LEDs emitting red (R) light, green (G) light, and blue (B) light. In a case in which the light sources 430 include LEDs emitting R light, G light, and B light, white light may be realized by turning on the LEDs at the same time so as to mix the R light, the G light, and the B light emitted from the LEDs.

The PCB 410 is a thin substrate on which a power line (not illustrated) is formed. For example, the PCB 410 may be a metal core PCB (MCPCB) including a metal with excellent thermal conductivity. In another example, the PCB 410 may be a flexible printed circuit board (FPCB) with flexibility. To drive the light sources 430 in each of the light source units 400, power may be applied from an external power source to the light sources 430 via the power line.

The mold frame 500 includes the sidewall portion 510 covering the light guide plate 300 and the light source units 400, and an extended portion 540 extended from the sidewall portion 510 so as to separate the optical sheets 700 from the light guide plate 300.

The sidewall portion 510 may form the sides of the display device 1. A step difference portion 530 may be formed on the exterior of the sidewall portion 510.

The extended portion 540 overlaps part of the top surface of the light guide plate 300 and can thus support the optical sheets 700 mounted thereon, and at the same time fix part of the light guide plate 300. An optical pattern sheet (not illustrated) for preventing light leakage and bright lines may be provided on the bottom surface of the extended portion 540.

The optical sheets 700 diffuse and collect light transmitted through the light guide plate 300. The optical sheets 700 may include a diffusion sheet 710, a prism sheet 730, and a protective sheet 750. The optical sheets 700 may also include a brightness enhancement sheet (not illustrated). Any or all of these sheets, as well as others, may be included in the optical sheets 700.

The diffusion sheet 710 may be disposed above the light guide plate 300, and may improve the brightness and the brightness uniformity of light applied thereto from the light exit surface 330 of the light guide plate 300. The diffusion sheet 710 may be formed by mixing a transparent resin and a diffusion material. In a non-limiting example, acrylic or PC may be used as the transparent resin, and particles of cross-linked PMMA, cross-linked polyethylene, cross-linked sodium polyacrylate, cross-linked silicone, a cross-linked acrylic-styrene copolymer, calcium carbonate, or barium sulfate may be used as the diffusion material.

The prism sheet 730 may be disposed on the diffusion sheet 710, and may collect light emitted from the diffusion sheet 710 so as to direct more light toward the viewer (i.e. normal to the upper surface of diffusion sheet 710, upwards in the view of FIG. 1). In a non-limiting example, the prism sheet 730 may include a vertical prism sheet and a horizontal prism sheet that collect light in a vertical direction and a horizontal direction, respectively.

The protective sheet 750 may be disposed on the prism sheet 730, and may protect the patterns formed on the prism sheet 730.

Due to the presence of the optical sheets 700, the uniformity and brightness of light supplied from the light guide plate 300 may be improved.

The bracket 550 may be coupled to the base cover 100 and the top cover 900 so as to fix the other elements of the backlight unit 10 inside the base cover 100.

The base cover 100 accommodates the light source units 400 and the light guide plate 300 therein. The base cover 100 may include a base plate 110 and a sidewall portion 120 extended from the edges of the base plate 110 and forming a storage space. The light guide plate 300 may be accommodated on the base plate 110 of the base cover 100 within this storage space, and the light source units 400 may also be accommodated in the space formed by the sidewall portion 120 of the base cover 100. A plurality of first coupling holes 130 for coupling the base cover 100 to the bracket 550 and the top cover 900 may be formed on the sidewall portion 120 of the base cover 100. The base cover 100 may be formed of, but is not limited to, a metal with excellent rigidity that rarely deforms or a metal with excellent thermal conductivity. For example, the base cover 100 may be formed of a plastic material.

Figure 2:
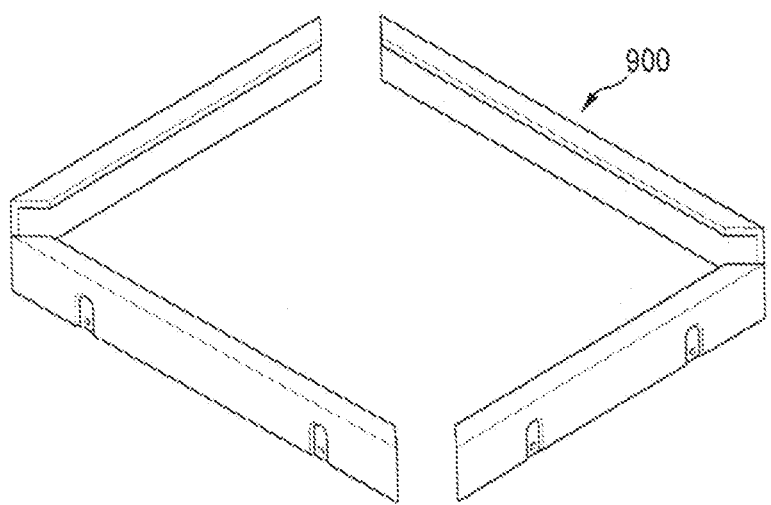
FIG. 2 is a perspective view illustrating a top cover used in a display device according to another embodiment.
Figure 3:
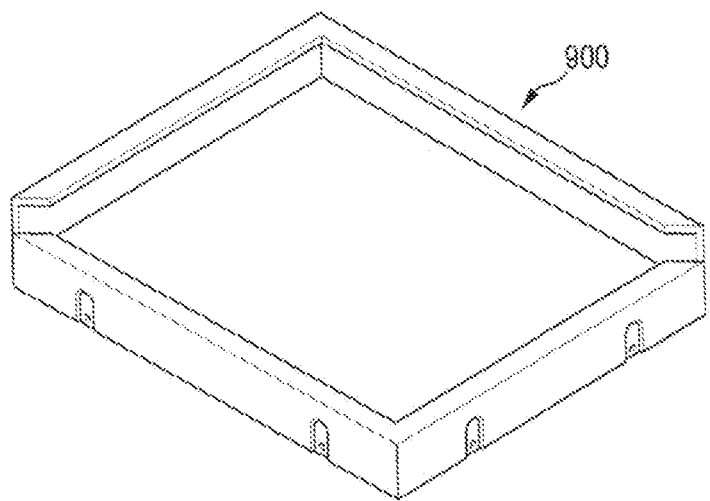
FIG. 3 is a perspective view illustrating a top cover used in a display device according to another embodiment.

FIG. 2 is a perspective view illustrating a top cover used in a display device according to another embodiment, and FIG. 3 is a perspective view illustrating a top cover used in a display device according to another embodiment.

Referring to FIGS. 1 to 3, the top cover 900 may be split into four separate or discrete border segments joined at each corner thereof, or may be split into two border segments joined at two diagonally opposite corners of the top cover 900. The more border segments the top cover 900 is split into, the more likely it is that the bezel portion 910 will crack and light leakage will occur.

Parts of the sidewall portion 920 corresponding to the second coupling holes 930 and the fixing elements 940 may be formed as recesses. In this example, once the coupling elements 950 and the fixing elements 940 are assembled together, none of the coupling elements 950 and the fixing elements 940 protrude from the exterior of the display device 1. Areas on the inner surface of the sidewall portion 920 corresponding to the recesses may protrude, conforming to the shape of the recesses.

Figure 4:
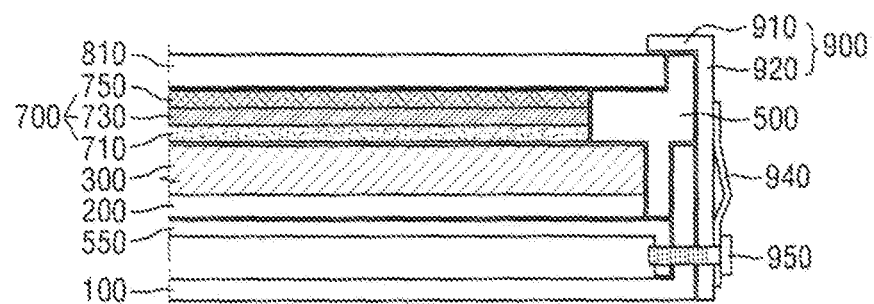
FIG. 4 is a cross-sectional view taken along line A-A of FIG. 1.

FIG. 4 is a cross-sectional view taken along line A-A of FIG. 1.

Referring to FIGS. 1 and 4, the display panel 810 and the backlight unit 10 may be accommodated in and fixed by the base cover 100 and the top cover 900. By using the coupling elements 950, the fixing elements 940, the top cover 900, the base cover 100 and the bracket 500 may be coupled together.

Referring to FIG. 4, since the coupling elements 950 are located at a lower portion of the sidewall portion 920, the fixing force between the display panel 810 and the bezel portion 910 may not be strong enough to prevent light leakage and a split of the display panel 810 from the bezel portion 910, and this problem is more apparent as the bezel portion 910 becomes narrow. The fixing elements 940 are coupled to the coupling elements 950, and thus apply force to parts of the sidewall portion 920 near the bezel portion 910. Accordingly, the bezel portion 910 can be prevented from being detached from the display panel 810, and the fixing force between the display panel 810 and the bezel portion 910 may be enhanced.

Figure 5:
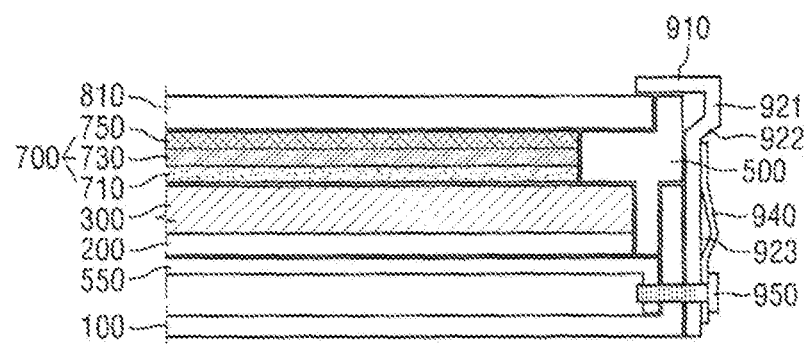
FIGS. 5 and 6 are cross-sectional views illustrating display devices according to other embodiments.
Figure 6:
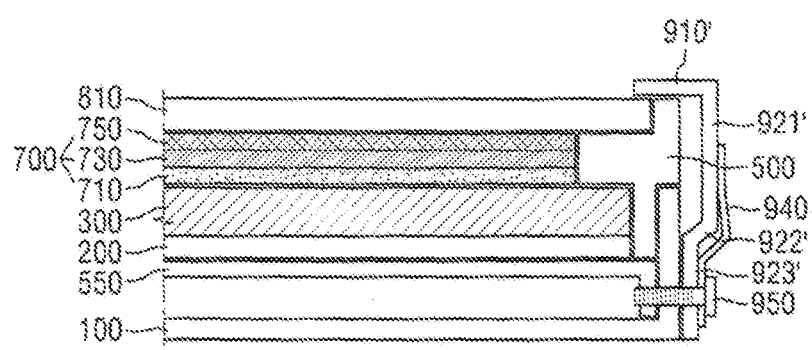

FIGS. 5 and 6 are cross-sectional views illustrating display devices according to other embodiments.

Referring to FIGS. 1, 5, and 6, parts of the sidewall portion 920 of the top cover 900 corresponding to the second coupling holes 930 and the fixing elements 940 or parts of the sidewall portion 920 corresponding to only the second coupling holes 930 may be recessed.

The top cover 900 may include a bezel portion 910 or 910', a first sidewall portion 921 or 921' bent and extended from the bezel portion 910 or 910', a bent portion 922 or 922' bent inwardly and extended from the first sidewall portion 921 or 921', and a second sidewall portion 923 or 923' extended from the bent portion 922 or 922' in parallel with the first sidewall portion 921 or 921'.

For example, the second sidewall portion 923 may be formed to correspond to the shape of the second coupling holes 930 and the shape and size of the fixing elements 940. In this example, during the rotation of the coupling elements 950, the fixing elements 940 may be fixed, instead of rotating along with the coupling elements 950, due to the presence of the bent portion 922.

For example, the second sidewall portion 923' may be provided only in areas corresponding to the second coupling holes 930. In this example, greater fixing force may be applied in areas receiving force from the fixing elements 940 than in areas not receiving force from the fixing elements 940.

Figure 7:
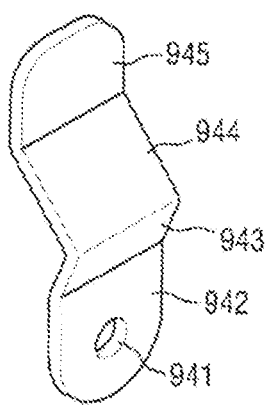
FIG. 7 is a perspective view illustrating a fixing element for use in a display device, according to an embodiment.
Figure 8:
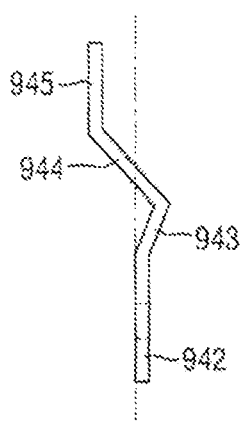
FIG. 8 is a side view illustrating the fixing element illustrated in FIG. 7.

FIG. 7 is a perspective view illustrating a fixing element for use in a display device, according to an embodiment, and FIG. 8 is a side view illustrating the fixing element illustrated in FIG. 7.

Referring to FIGS. 7 and 8, a fixing element 940 may include a first coupling portion 942 with a third coupling hole 941, a first bent portion 943 bent and extended from the first coupling portion 942, a second bent portion 944 bent and extended at an angle with respect to the first bent portion 943, and a first contact portion 945 extended from the second bent portion 944 in parallel with the first coupling portion 942 so as to contact and thereby apply pressure to the sidewall 920.

The first bent portion 943 and the second bent portion 944 may be bent at any angles, so as to help apply an elastic force to sidewall portions 920 of the top cover 900.

The first contact portion 945 may be located inward (i.e. toward the sidewalls 920 when in use) from a reference surface of the first coupling portion 942, as indicated by a dot-and-dashed line of FIG. 8. Accordingly, in response to a coupling element 950 being coupled to the first coupling portion 942 and deforming the fixing element 940 so that the first coupling portion 942 and the first contact portion 945 are approximately coplanar with each other, the fixing force applied inwardly by the first contact portion 945 may increase due to the elastic force at least partially generated by the first bent portion 943 and the second bent portion 944.

Figure 9:
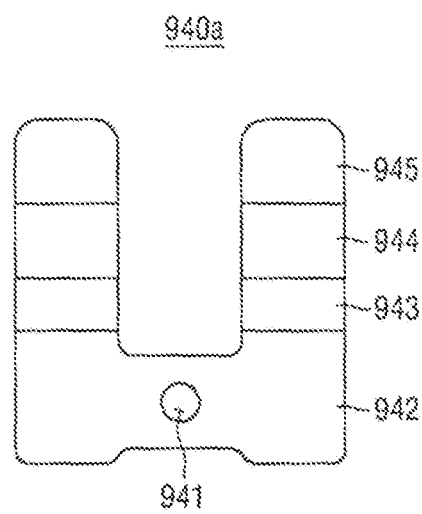
FIGS. 9 and 10 are plan views illustrating fixing elements for use in a display device, according to other embodiments.
Figure 10:
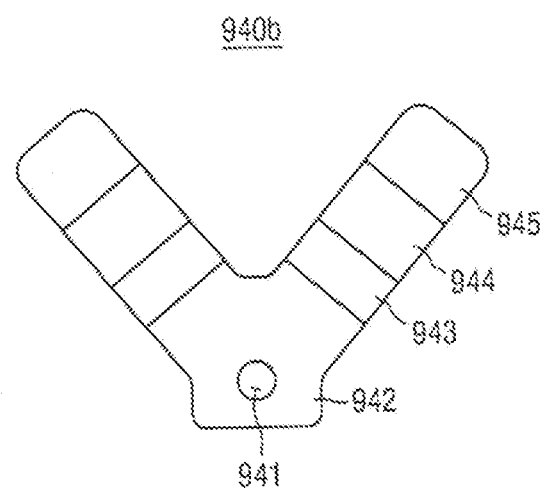

FIGS. 9 and 10 are plan views illustrating fixing elements for use in a display device, according to other embodiments.

Referring to FIGS. 9 and 10, fixing elements 940a, 940b may include a first coupling portion 942, a plurality of first bent portions 943 extended from the first coupling portion 942, a plurality of second bent portions 944 extended from the first bent portions 943, respectively, and a plurality of contact portions 945 extended from the second bent portions 944, respectively. The first bent portions 943, the second bent portions 944, or the contact portions 945 may be formed in symmetry with each other, or may be aligned in parallel with each other, as shown in FIG. 9. The first bent portions 943, the second bent portions 944, or the contact portions 945 may also be extended radially from the first coupling portion 942 with a predetermined angle between the two sets of portions 943-945, as shown in FIG. 10. For example, the included angle formed by the first bent portions 943, the second bent portions 944, or the contact portions 945 may be in the range of 10 to 150 degrees.

For example, the first coupling portion 942 may be formed to have a relatively larger width than the first bent portions 943, the second bent portions 944, and the contact portions 945. In this example, since a part of the sidewall portion 920 corresponding to the fixing element 940 can be formed as a recess conforming to the shape of the fixing element 940, the fixing element 940 can be fixed even during the rotation of a coupling element 940.

Figure 11:
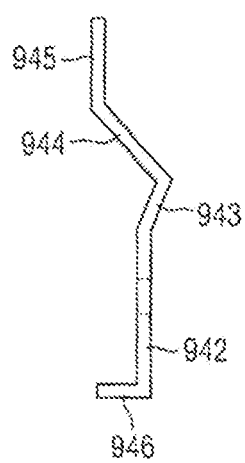
FIG. 11 is a side view illustrating a fixing element for use in a display device, according to another embodiment.
Figure 12:
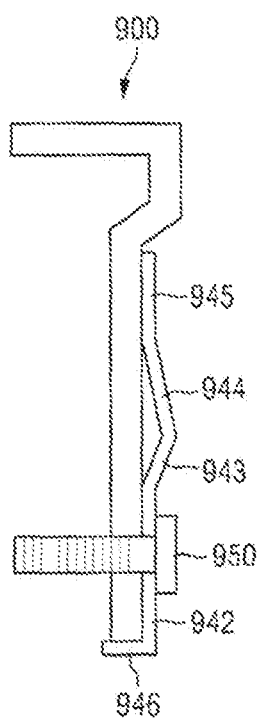
FIG. 12 is a cross-sectional view illustrating the coupling of the fixing element illustrated in FIG. 11 to a top cover by a coupling element.

FIG. 11 is a side view illustrating a fixing element for use in a display device, according to another embodiment, and FIG. 12 is a cross-sectional view illustrating the coupling of the fixing element illustrated in FIG. 11 to a top cover by a coupling element.

Referring to FIGS. 11 and 12, a fixing element 940, like the fixing element 940 illustrated in FIG. 8, may include a first coupling portion 942, a first bent portion 943, a second bent portion 944, and a first contact portion 945, and may also include a fixing portion 946 extended in the opposite direction to the first bent portion 943 (i.e., inward, toward the center of the bottom of base cover 100). Due to the presence of the fixing portion 946, the fixing element 940 may be fixed to a lower portion of the sidewall portion 920 and may thus be prevented from rotating along with a coupling element 950 during the coupling of the coupling element 950 to the fixing element 940.

Figure 13:
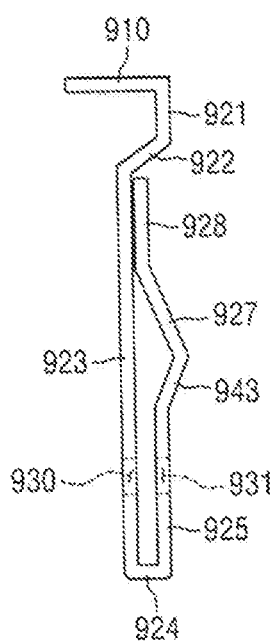
FIG. 13 is a cross-sectional view illustrating a top cover used in a display device according to another embodiment.

FIG. 13 is a cross-sectional view illustrating a top cover used in a display device according to another embodiment.

Referring to FIGS. 1 and 13, a display device 1 according to another embodiment may include a display panel 810, a top cover 900 disposed over the display panel 810, a backlight unit 10 disposed below the display panel 810, a base cover 100 accommodating the backlight unit 10 therein and coupled to a top cover 900, and a plurality of coupling elements 950 coupling the top cover 900, the base cover 100, and the backlight unit 10 together.

The top cover 900 may include: a bezel portion 910; a first sidewall portion 921 bent and extended from the bezel portion 910; a bent portion 922 bent inwardly and extended from the first sidewall portion 921; a second sidewall portion 923 extended from the bent portion 922 so as to be substantially in parallel with the first sidewall portion 921 and including a second coupling hole 930; a second coupling portion 925 bent outwardly more than once and extended from the second sidewall portion 923 so as to be substantially in parallel with the second sidewall portion 923 and including a third coupling hole 931 corresponding to the second coupling hole 930; an elastic connection portion extended from the second coupling portion 925; and a contact portion 928 extended from the elastic connection portion. A connecting portion 924 connects portions 923 and 925, although this connecting portion 924 need not necessarily be present if, for instance, only a single bend is made between portions 923 and 925.

The sidewall portion 920 is illustrated in FIG. 13 as having a recess, but the present inventive concept is not restricted to the example illustrated in FIG. 13.

In a case in which a coupling element 950 is yet to be coupled into the second coupling portion 925, the contact portion 928 may be substantially in parallel with the second coupling portion 925. Then, in response to a coupling element 950 being coupled into the second coupling portion 925 so as for the second coupling portion 925 to be pressurized inwardly, the fixing force applied inwardly by the contact portion 928 may increase due to the elastic force of the elastic connection portion.

The elastic connection portion may include a first elastic connector 926 bent outwardly and extended from the second coupling portion 925 toward the bezel portion 910, and a second elastic connector 927 bent inwardly and extended from the first elastic connector 926 toward the bezel portion 910.

The first elastic connector 926 and the second elastic connector 926 may be bent in opposite directions, and may thus produce an elastic force pressing the bezel portion 910 inward toward the center of the display panel 810.

Embodiments have been described above, taking a liquid crystal display (LCD) as an example, but the present inventive concept is not restricted to an LCD. That is, the present inventive concept can be applied to any display, such as an organic light-emitting diode (OLED) device that does not require any additional light sources or light guide plates, or to a plasma display device that displays images using plasma.

While the present invention has been particularly shown and described with reference to exemplary embodiments thereof, it will be understood by those of ordinary skill in the art that various changes in form and detail may be made therein without departing from the spirit and scope of the present invention as defined by the following claims. Different features of the various embodiments either shown or contemplated may be mixed and matched in any manner so as to generate further embodiments contemplated by the invention. The exemplary embodiments should be considered in a descriptive sense only and not for purposes of limitation.

What is claimed is:

1. A display device, comprising:
a base cover having a base plate, a sidewall portion extended from edges of the base plate, and a first coupling hole;
a display panel configured to be accommodated within the base cover and having a first display portion configured to display an image and a second display portion provided outside and along the first display portion;
a top cover having a bezel portion sized to be laid over the second display portion, and a sidewall portion extended from the bezel portion to cover sides of the display panel, the top cover including a second coupling hole corresponding to the first coupling hole; and
a fixing element configured to include a first coupling portion having a third coupling hole corresponding to the first coupling hole and the second coupling hole, the fixing element further having a contact portion extended from the first coupling portion and configured and shaped to maintain contact with the sidewall portion of the top cover;
wherein the base cover, the top cover, and the fixing element are sized and shaped so as to be coupled together with the display panel contained within the base cover and with each of the first, second, and third coupling holes aligned so that a coupling element can be inserted through the first coupling hole, the second coupling hole, and the third coupling hole so as to press the contact portion against at least the sidewall portion of the top cover.

2. The display device of claim 1, wherein the fixing element is further configured to include a bent portion bent more than once between the first coupling portion and the contact portion.

3. The display device of claim 1, wherein the first coupling portion and the contact portion are formed to be substantially flat and oriented substantially parallel to each other, and are not coplanar.

4. The display device of claim 1, wherein the fixing element is further configured to include a plurality of contact portions extended from the first coupling portion.

5. The display device of claim 4, wherein the contact portions extend substantially parallel to each other.

6. The display device of claim 1, wherein two of the contact portions have an included angle of about 10 to about 150 degrees.

7. The display device of claim 1, wherein the contact portion is oriented along a first direction, the fixing element is further configured to include a fixing portion oriented along a second direction different from the first direction, and the fixing portion covers a lower part of the sidewall portion of the top cover when the base cover, the top cover, and the fixing element are coupled together.

8. The display device of claim 1, wherein the top cover has two or more discrete segments.

9. The display device of claim 1, wherein the second coupling hole is positioned within a recess formed in the sidewall portion of the top cover, the recess being sized to accept the first coupling portion of the fixing element.

10. The display device of claim 9, wherein the recess conform to the shape of at least the first coupling portion of the fixing element.

11. A display device, comprising:
a base cover having a base plate, a sidewall portion extended from edges of the base plate, and a first coupling hole;
a display panel configured to be accommodated within the base cover and having a first display portion configured to display an image and a second display portion provided outside and along the first display portion; and
a top cover having a bezel portion sized to be laid over the second display portion, a sidewall portion extended from the bezel portion to cover sides of the display panel, a second coupling hole corresponding to the first coupling hole, a second coupling portion bent more than once and extended from the sidewall portion of the top cover at a location corresponding to the second coupling hole and including a third coupling hole corresponding to the first coupling hole and the second coupling hole, an elastic connection portion extended from the second coupling portion, and a contact portion extended from the elastic connection portion;

wherein the base cover and the top cover are sized and shaped so as to be coupled together with the display panel contained within the base cover and with each of the first, second, and third coupling holes aligned so that a coupling element can be inserted through the first coupling hole, the second coupling hole, and the third coupling hole so as to press the contact portion against at least the sidewall portion of the top cover.

12. The display device of claim 11, wherein the elastic connection portion includes a bent portion bent more than once.

13. The display device of claim 11, wherein the second coupling portion and the contact portion are formed to be substantially flat and oriented substantially parallel to each other, and are not coplanar.

14. The display device of claim 11, wherein the top cover has two or more discrete segments.

15. The display device of claim 11, wherein the second coupling hole and the contact portion are positioned within recesses in the top cover.

16. A fixing element, comprising:
a fixing element sized and configured for attachment to, and the application of pressure to, a cover of a flat panel display, the fixing element comprising:
 a coupling portion including a coupling hole into which a coupling element is to be inserted so as to affix the coupling portion to the cover of the flat panel display;
 a bent portion bent more than once and extended from the coupling portion; and
 a contact portion extended from the bent portion and shaped so as to apply pressure to the cover of the flat panel display when the coupling portion is affixed to the cover of the flat panel display by the coupling element;
wherein the bent portion includes a first bent portion and a second bent portion, the second bent portion being bent and extended in the opposite direction to the first bent portion.

17. The fixing element of claim 16, wherein the coupling portion and the contact portion are substantially flat and oriented substantially parallel with each other, and not coplanar.

18. The fixing element of claim 16, further comprising:
a fixing portion bent and extended from the coupling portion in a direction different than a direction along which the bent portion extends.

* * * * *